(12) United States Patent
Jones et al.

(10) Patent No.: US 9,019,309 B2
(45) Date of Patent: Apr. 28, 2015

(54) ADAPTIVE IMAGE MANIPULATION

(75) Inventors: Chad E. Jones, Santa Clara, CA (US); John S. Harper, San Francisco, CA (US); Richard R. Dellinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 13/491,520

(22) Filed: Jun. 7, 2012

(65) Prior Publication Data

US 2013/0328859 A1    Dec. 12, 2013

(51) Int. Cl.
*G09G 5/00* (2006.01)
*G06T 15/00* (2011.01)

(52) U.S. Cl.
CPC .................................... *G06T 15/00* (2013.01)

(58) Field of Classification Search
None
See application file for complete search history.

(56) References Cited

U.S. PATENT DOCUMENTS

| | | | |
|---|---|---|---|
| 6,121,977 A * | 9/2000 | Arai et al. | 345/619 |
| 7,249,846 B2 | 7/2007 | Grand et al. | |
| 7,494,229 B2 | 2/2009 | Miyasaka | |
| 7,739,613 B2 * | 6/2010 | Lindsay | 715/768 |
| 2002/0164083 A1 * | 11/2002 | Song et al. | 382/275 |
| 2007/0139408 A1 * | 6/2007 | Keranen | 345/426 |
| 2008/0143713 A1 * | 6/2008 | Chiu et al. | 345/420 |
| 2008/0218641 A1 * | 9/2008 | Kjeldsen et al. | 348/746 |
| 2009/0033661 A1 * | 2/2009 | Miller | 345/426 |
| 2010/0061642 A1 | 3/2010 | Kondo et al. | |

\* cited by examiner

*Primary Examiner* — Daniel Hajnik
(74) *Attorney, Agent, or Firm* — Kenyon & Kenyon LLP

(57) ABSTRACT

Shadows, reflections, and other image effects for use with high-resolution display screens may be quickly and efficiently generated to maximize resources available for other applications and programs. These effects may be quickly and efficiently created by identifying a region surrounding an image, distorting the image in the region, applying a uniform blur and/or other effect to the distorted image, and then undoing the distortion. By selectively applying effects to distorted images, it is possible to create the appearance of a non-uniformly applied blur and other effects without using the computing resources required to actually calculate and apply a non-uniform blur on a pixel-by-pixel basis. Systems, methods, and media are provided.

27 Claims, 5 Drawing Sheets

FIG. 3
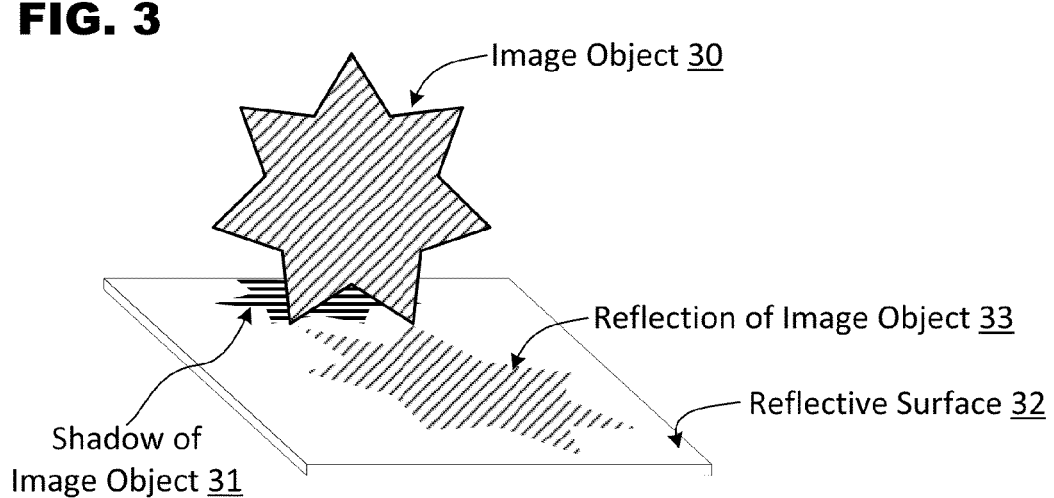
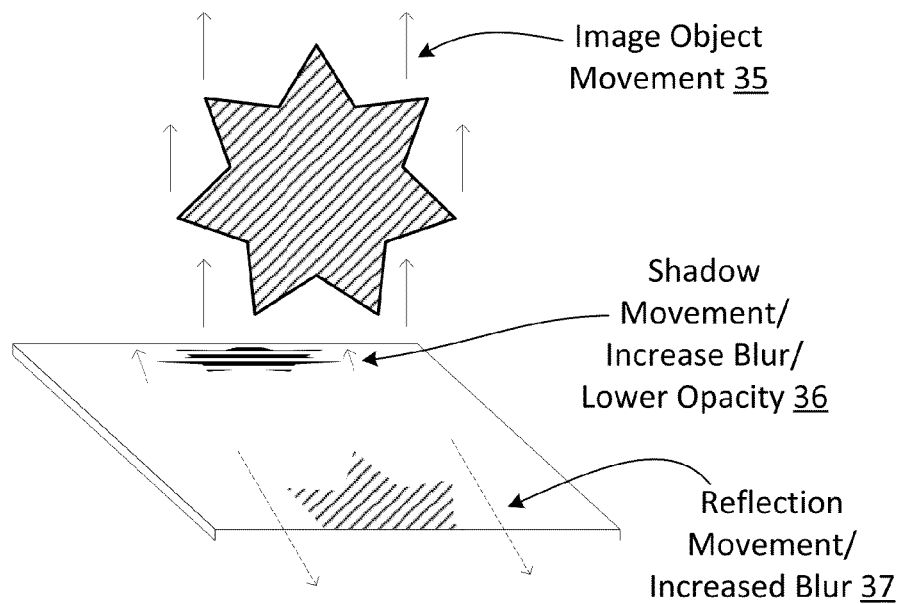

ADAPTIVE IMAGE MANIPULATION

BACKGROUND

Many computing systems and electronic devices include a graphics processing unit that creates sequences of images displayed to a user on a screen or display. Technological advancements have resulted in higher resolution displays that are capable of producing sharper and more detailed images to users. As a result, image resolution has typically been increased to prevent the perception of poor image quality by users viewing images on the higher resolution displays.

The increased image resolution has resulted in increased loads for graphics processors. These load increases may be even higher for more sophisticated image processing functions, such as three dimensional rendering and the creation of reflections, shadows, and other effects involving reflective and/or transparent surfaces. In some instances, it may be desirable to quickly display realistic, high resolution reflections, shadows, and other three dimensional effects of objects located near reflective or transparent surfaces of other objects as part of a background process using minimal computing resources.

For example, an application or operation system may cause one or more icons or other objects to be displayed on a screen as though they are located on top of a glass shelf. To improve image quality and make it appear as though the objects are actually located on top of a glass shelf, a reflection and shadow of the objects on the glass shelf may also be created.

In the past, these reflection, shadows, and other three dimensional effects were created using very simple image processing techniques, such as directly applying a uniform blur to a mirror image of the object to create a reflection effect, or darkening and resizing a copy of the object to create a shadow effect. These techniques were computationally efficient and could be quickly performed as part of a background process using minimal resources. However the resulting image quality of these generated effects was poor and inadequate for use on higher resolution displays. While more sophisticated three dimensional image processing techniques could be applied to create more realistic effects, these image processing techniques are too computationally intensive to be performed quickly and efficiently as background processes.

There is thus a need to quickly and efficiently generate high resolution three dimensional image processing effects for use with higher resolution displays.

BRIEF DESCRIPTION OF THE DRAWINGS

FIG. 3 shows exemplary shadow, reflection, and movement effects of a image object with respect to a reflective surface.

DETAILED DESCRIPTION

In an embodiment of the invention, high resolution three dimensional image processing effects may be generated using techniques and algorithms that may be quickly executed as background processes to maximize resources available for other applications and programs. In different embodiments, non-uniform image effects, such as a non-uniform blur, may be applied by distorting an image, applying a uniform blur to the distorted image, and then undoing the distortion. By selectively applying the distortion to different sections of the image, it is possible to create the appearance of a non-uniformly applied blur without using the computing resources required to actually calculate and apply a non-uniform blur on a pixel-by-pixel basis.

Other effects may be also be applied to the image before, during, or after the image is distorted. For example, in some instances the image may be blackened, an opacity of the image may be modified, the image may be flipped, a color saturation may be changed, or an offset may be provided. One or more of these effects may be applied to create high resolution shadows, reflections, and other three dimensional effects.

Figure 1:
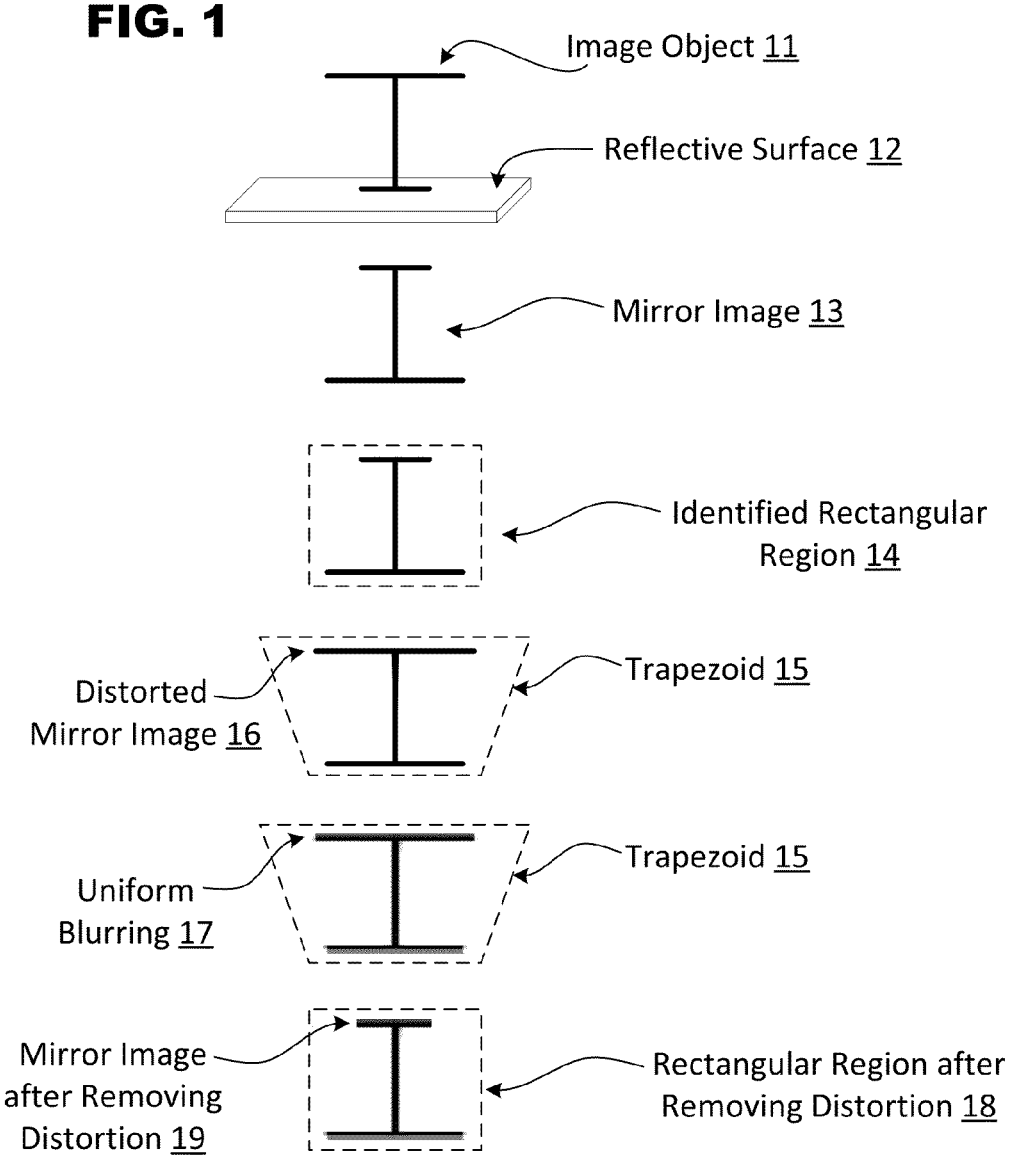
FIG. 1 shows an exemplary embodiment of the invention in which distortion is used to create an appearance of non-uniformly applied blur.

FIG. 1 shows an exemplary embodiment of the invention in which distortion is used to create an appearance of non-uniformly applied blur to images. In this example, an image object 11 may be displayed at a position on the screen in relation to an at least partially reflective surface 12 where the image object 11 would ordinarily be expected to cast a shadow or reflection on the reflective surface 12.

To create the appearance of a shadow or a reflection on the screen, a processing device may create a mirror image 13 of the image object 11. The mirror image 13 may be a reflected copy of the image object 11. The mirror image 13 may appear to be identical to the image object 11, except that the image in the mirror image 13 may be reversed from that in the image object 11.

Once the mirror image 13 is created, a rectangular region 14 that encompasses the mirror image 13 may be identified. In some instances the rectangular region 14 may be identified by identifying the smallest possible rectangle that wholly encompasses each pixel in the mirror image 13. In other instances, the rectangular region 14 may be identified based on a border, outline, image size, or other parameter specified in an image file containing the image object 11. For example, image files in the portable network graphics (PNG) format and other formats typically include information about the width and height of an image, which may also be used as the rectangular region 14 and/or as a basis for identifying the rectangular region 14.

In other instances the size of the rectangular region may be fixed and the mirror image 13 may be adjusted accordingly to be encompassed by the rectangular region. Different region shapes may be used in other embodiments instead of rectangular regions 14. For example, octagons, polygons, circles, and other shapes may be used to identify different regions or shapes that encompass the mirror image 13.

Once the rectangular or other region 14 has been identified, the region 14 and mirror image 13 in the region 14 may be distorted 16 by stretching or compressing different sections of the image 13 and region 14. For example, in the case of FIG. 1, the side of the rectangular region 14 of the mirror image 13 that is closest to the image object 11 may be stretched to form a trapezoid 15. The mirror image 13 may also be stretched to create a distorted mirror image 16 that in this example may look like a capital letter "I."

In other instances, different sections of the mirror image 13 and rectangular region 14 may be stretched or compressed. For example, instead of stretching the side of the mirror image 13 closest to the image object 11, the opposite side of the mirror image 13 that is furthest from the image object 11 may be compressed. In other instances, both the closest side of the mirror image 13 may be stretched and the furthest side may be compressed.

Once the distorted mirror image 16 has been created, a uniform blur effect 17 may be applied to the mirror image. The uniform blur effect 17 may apply a same amount of blur to each pixel or group of pixels in the mirror image 13. Other effects may also be applied in addition to or instead of the uniform blur effect. For example, an opacity change, color saturation change, blackening effect, or offset may be applied in addition to or instead of the blur effect.

Once the uniform blur 17 and/or other effects have been applied, the distortions 15 and 16 applied to the rectangular region 14 and mirror image 13 respectively, may be removed to once again form the rectangular region 18 and the mirror image 19. The removal and undoing of the distortions 15 and 16 may cause the mirror image to be compressed and/or stretched in order to have the image and the region return to their original shape. The compression and/or stretching that occurs as a result of undoing the distortions 15 and 16 may make the uniformly applied blur to the distorted image 16 appear as though it was non-uniformly applied to the re-formed shape 19 of the original mirror image 13. This appearance may result from the compression and/or stretching of different sections of the uniformly blurred distorted image 17 at different rates.

Figure 2:
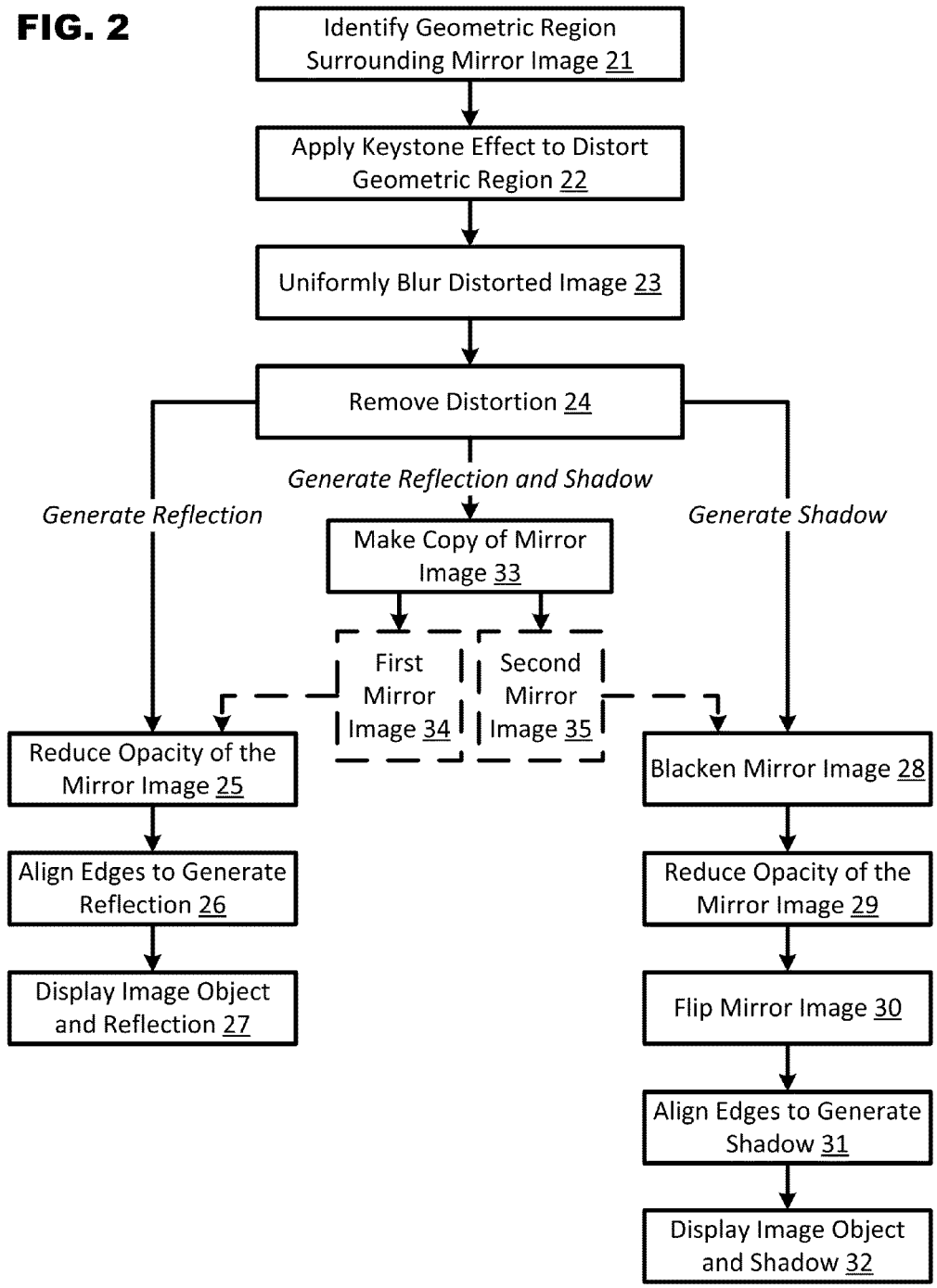
FIG. 2 shows exemplary processes in different embodiments of the invention.

FIG. 2 shows exemplary processes in different embodiments of the invention. In some instances, one or more of these processes may be stored in a set of instructions on a non-transitory computer readable medium, that when executed by a processing device, cause the processing device to perform the process.

In box 21, a rectangular or other geometric region surrounding a mirror image of an image object in a computing system may be identified. The mirror image may be a reversed copy of the image object. The reversed copy may represent an appearance of the image in a mirror or other reflective surface. In other instances the mirror image may be obtained from a user supplied image designated as the mirror image of the image object. A user supplied image may be used when different lighting conditions or other effects would result in a reversed copy of the image object to incorrectly depict an appearance of the image in a mirror or other reflective surface.

In box 22, a processing device may be used to distort the geometric region by applying a keystone or other distortion effect. Applying a keystone effect may distort the geometric region by compressing and/or expanding one or more sections of the geometric region. For example, if the geometric region is a rectangular region, applying a keystone effect may distort the rectangular region into a trapezoid by expanding or compressing one or more sides of the rectangle. In Euclidean geometry, the two parallel side of a trapezoid may be referred to as bases while the other two sides may be referred to as legs. In some instances the trapezoid may be an isosceles trapezoid in which the two legs of the trapezoid have an equal length. In other instances the trapezoid may be a non-isosceles trapezoid.

In box 23, a uniform blur may be applied to the distorted mirror image.

In box 24, the distortion applied to the geometric region and the mirror image may be removed. If the distorted region is shaped as an isosceles trapezoid, then the blur may appear to be even distributed along dimensions parallel to the bases of the trapezoid after the distortion is removed. However, if the distorted region is a non-isosceles trapezoid, then the blur may appear to be non-uniformly distributed along dimensions both parallel and non-parallel to the bases of the trapezoid after the distortion is removed.

Once the distortion is removed, the process may then be used in some instances to quickly generate a high resolution reflection of the image object, a high resolution shadow of the image object, or both a high resolution reflection and a high resolution shadow of the image object. Boxes 25 to 27 may relate to generating the high resolution reflection. Boxes 28 to 32 may relate to generating the high resolution shadow. Boxes 25 to 35 may relate to generating both the high resolution reflection and the high resolution shadow.

In box 25, an opacity of the mirror image may be reduced.

In box 26, an edge of the geometric region surrounding the mirror image may be aligned with a corresponding edge of the image object to generate the reflection. In some instances, the aligned edge of the rectangular region may also form a longest base of a pair of parallel bases of the trapezoid, if the geometric region is rectangular and is distorted into a trapezoid.

To initially distort the rectangular region into the trapezoid as indicated in box 22, in some instances a length of the edge of the rectangular region that is to be aligned with the corresponding edge of the image object may be extended. In other instances, the length of an edge of the rectangular region opposite to the edge that is to be aligned with the corresponding edge of the image object may be contracted to distort the rectangular region into the trapezoid in box 22. In other instances, a keystone effect may be applied to the geometric region and the mirror image to distort the region and the mirror image.

In box 27, the image object may be displayed with the generated reflection. In some instances, the image object may be displayed on a display device to appear as though it is positioned above a glass pane that is also displayed on the screen. The generated reflection may then be displayed on the display device to appear as a reflection of the image object off of the glass pane. FIG. 3 shows an exemplary image object 30 and reflective surface 32, such as a glass pane, as displayed on a display device. Also shown in FIG. 3, is an exemplary reflection 33 of the image object 30 off the reflective surface 32 as it may be displayed on the display device. An exemplary shadow 31 of the image object 30 off the reflective surface 32 is also shown.

In box 28, the mirror image may be blackened. The mirror image may be blacked by decreasing the color saturation or otherwise making the mirror image appear darker or black.

In box 29, an opacity of the mirror image may be reduced.

In box 30, the mirror image may be flipped, rotated, or otherwise re-positioned to correctly correspond to the position of a shadow. Typically mirror images are reversed copies of an actual image as reflections appear as reversed images. Shadows, however, generally are not reversed. Thus, flipping the mirror image may facilitate accurate alignment and orientation of the shadow effect when the shadow is displayed.

In box 31, an edge of the geometric region surrounding the flipped mirror image may be aligned with a corresponding edge of the image object to generate the shadow.

In box 32, the image object may be displayed with the generated shadow.

In box 33, a copy of the mirror image may be created.

In box 34, one of the mirror images, which may be either the original mirror image or the copy made in box 33, may be used to generate and display the reflection in boxes 25 to 27.

In box 35, the other of the mirror images, which may be either the original mirror image or the copy made in box 33, may be used to generate and display the shadow in boxes 28 to 32.

When generating a reflection, boxes 25 and 26 may be performed in any order, before, during, or after, any of boxes 21 to 24. When generating a shadow, boxes 28 to 31 may also be performed in any order, before, during, or after, any of boxes 21 to 24.

After displaying the image object and its generated reflection in box 27 and/or its generated shadow in box 32, the image object may be moved by a user or other process. FIG. 3 shows an exemplary movement of the image object 35 in a vertical direction after the image object 30, its reflection 33, and its shadow 31 have been displayed on a display device to the user.

In response to a movement 35 of the image object, the generated reflection that is displayed on the display device may also be moved 37 proportionately to the movement 35 of the image object. In some instances an additional blur may also be applied to one or more pixels or pixel groups of the moving generated reflection 37 as a first function of a distance from a reference position. The applied blur may increase as the distance from the reference position increases.

In addition to or instead of adding blur, in some embodiments an opacity of the generated moving reflection 37 may be reduced as a second function of the distance from the reference position. In some instances, the first and the second functions may, but need not, be a same function. In other instances, the first function and the second function may be different ones of a linear function and a polynomial function.

In response to a movement 35 of the image object, the generated shadow that is displayed on the display device may also be moved 36 proportionately to the movement 35 of the image object. In some instances, an additional blur may be applied to one or more pixels or pixel groups of the moving generated shadow 36 as a first function of a distance from a reference position. The applied blur may increase as the distance from the reference position increases.

In addition to or instead of adding blur, in some embodiments an opacity of the generated moving shadow 36 may be reduced as a second function of the distance from the reference position.

In some instances when both a generated shadow 21 and generated reflection 33 are both displayed with the image object 30, the mirror image may be copied to create a second copy in addition to the original copy. Once of the copies may be used to generate the reflection 33 and the other may be used to generate the shadow 31.

In some instances, wherein the image object 30 may be displayed on a screen to appear as positioned above a glass pane or other reflective surface 32. The generated reflection 33 may be displayed to appear as a reflection 33 of the image object 30 off the glass pane 32. The generated shadow 31 may be displayed to appear as a shadow 31 of the image object 30 on the glass pane 32.

Figure 4:
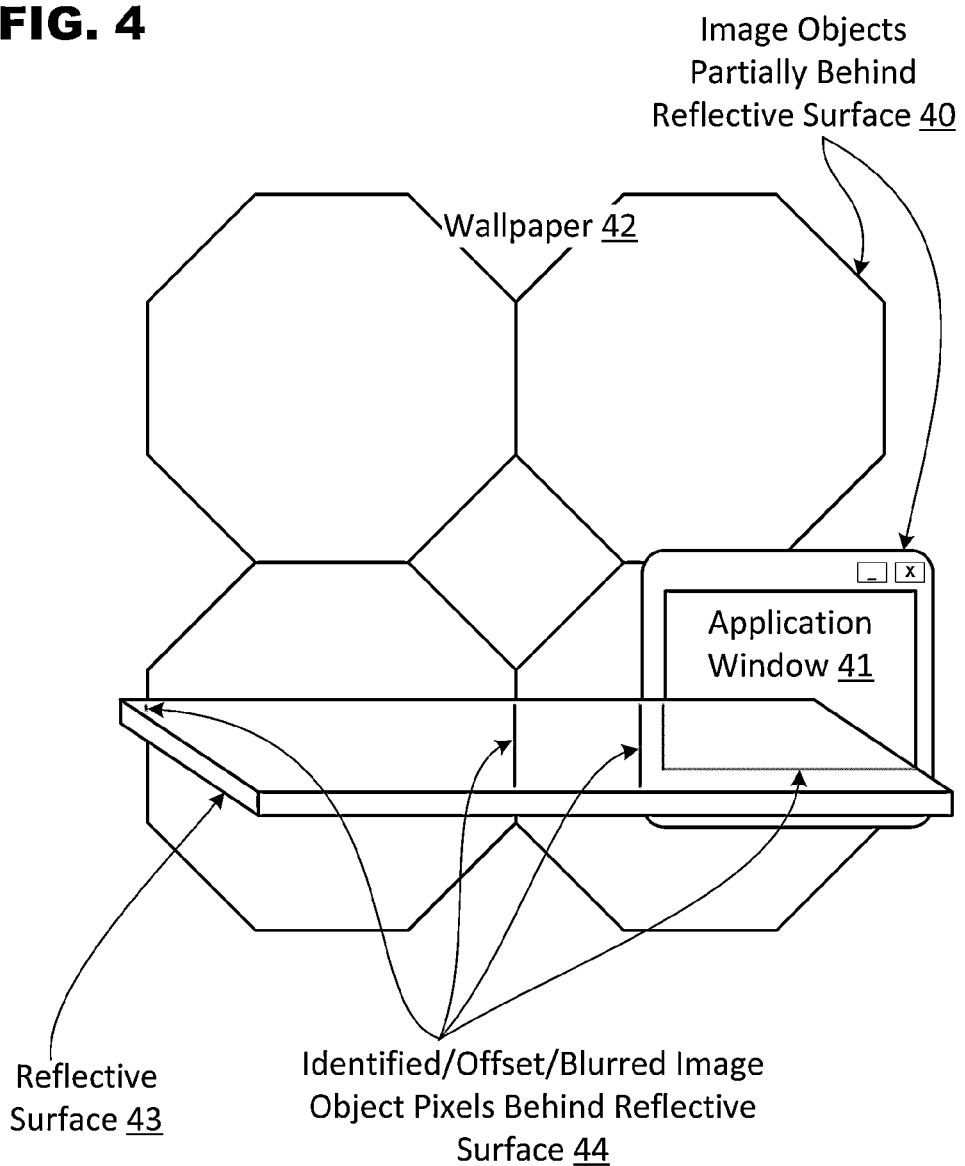
FIG. 4 shows an embodiment of the invention in which objects are displayed to appear as though they are located at least partially behind a reflective surface.

FIG. 4 shows an embodiment of the invention in which some image objects 40 are displayed to appear as though they are located behind the reflective surface 43. In this example, a desktop wallpaper 42 and an application window 41 of computer program are displayed to appear as though they are positioned behind the glass pane reflective surface 43. The wallpaper 42 may be covered at least partially by the application program window 41.

To create this appearance, in some instances a processing device may identify those pixels 44 of the image object(s) 40 that are to appear as though they are positioned behind the glass pane or reflective surface 43. The identified pixels 44 may then be offset, blurred, and/or increased in color saturation. Thereafter, the identified pixels 44 may be displayed on the screen as shown in FIG. 4.

Figure 5:
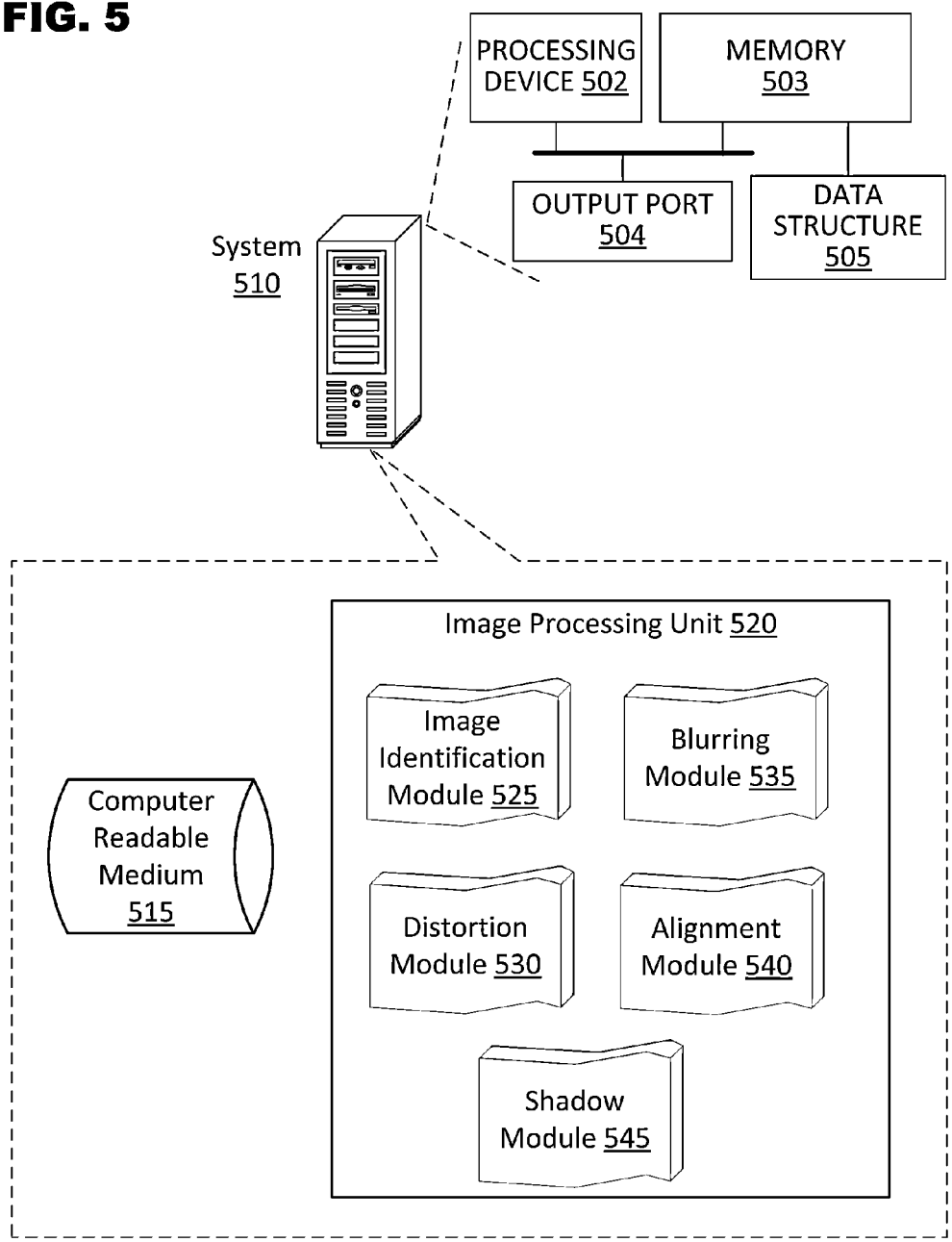
FIG. 5 shows an exemplary architecture in an embodiment of the invention.

FIG. 5 shows an exemplary architecture in an embodiment of the invention. A system 510 may include a computer readable medium 515 storing image data and an image processing unit 520 containing modules 525 to 545 for processing the image data. The computer readable medium 515 may contain a hard disk drive, flash memory, or other storage device capable of storing data. The modules 525 to 540 in the image processing unit 520 may include an image identification module 525, a distortion module 530, a blurring module 535, an alignment module 540, and/or a shadow module 545.

In some instances, one or more of these modules 525 to 545 may include a set of instructions for instructing a processing device 502 and/or the image processing unit 520 how to process the image data to perform the functionality associated with the respective module 525 to 545. These instructions may be stored in the computer readable medium 515, a memory 503, or data structure 505.

The processing device 502 and/or image processing unit 520 may execute the image processing instructions associated with each of the modules 525 to 545. The processing device 502 may also receive and/or process an instruction to generate an effect, such as a reflection and/or shadow, of an image object.

The image identification module 525 may include functionality for identifying a rectangular region surrounding a mirror image of the image object in the instruction received at the processing device.

The distortion module 530 may include functionality for distorting the identified rectangular region in the image identified module into a trapezoid. The distortion module 530 may also include functionality for removing the distortion applied to the rectangular region and the mirror image once the blurring module 535 has completed its blurring.

The blurring module 535 may include functionality for uniformly blurring the distorted mirror image in the trapezoid before the distortion module removes the distortion.

In some instances, the alignment module 540 may include functionality for aligning an edge of the rectangular region identified by the image identification module surrounding the mirror image with a corresponding edge of the image object to generate the reflection. In some instances, the alignment module 540 may include functionality for aligning an edge of a rectangular region surrounding the mirror image copy flipped by the shadow module 545 with a corresponding edge of the image object to generate a shadow.

In some instances, the image processing unit 520 may also include a shadow module 545 that may include functionality for copying the mirror image after the distortion module 530 removes the distortion, blackening the mirror image copy, reducing an opacity of the mirror image copy, and flipping the mirror image copy.

The system 510 may also include an output port 504. The output port 504 may include an interface through which the image object with the generated reflection and/or the generated shadow may be outputted to a display device after the applied distortion is removed by the distortion module 530.

System 510 may contain a processing device 502, memory 503 storing loaded data or a loaded data structure 505, and an output port 504, all of which may be interconnected via a system bus. System 510 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Output port 504 may enable connectivity between the system 510 and an external high resolution display screen so that image data can be displayed on the display screen. Memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the image processing unit 520 is shown as a separate component from the processing device 502, in some instances the image processing unit 520 may include or otherwise use the processing device 502 to process image data.

We claim:

1. A method for non-uniformly blurring a mirror image of an image object comprising:
   identifying a geometric region surrounding the mirror image of the image object;
   applying a keystone effect using a processing device to distort the geometric region;
   uniformly blurring the distorted mirror image in the distorted geometric region;
   removing the distortion applied to the geometric region and the mirror image;
   aligning an outer boundary edge of the geometric region surrounding the mirror image with a corresponding edge of the image object to generate a reflection of the image object; and
   displaying the image object with the generated reflection,
   wherein the geometric region is a rectangular region, the rectangular region is distorted into a trapezoid in response to the keystone effect being applied, and the aligned edge of the rectangular region forms a longest base of a pair of parallel bases of the trapezoid.

2. The method of claim 1, further comprising, when the method is used to generate the reflection of the image object, and after the distortion has been removed:
   reducing an opacity of the mirror image.

3. The method of claim 1, wherein the trapezoid is an isosceles trapezoid.

4. The method of claim 3, further comprising extending a length of the edge of the rectangular region that is to be aligned with the corresponding edge of the image object to distort the rectangular region into the trapezoid.

5. The method of claim 3, further comprising contracting a length of an edge of the rectangular region opposite to the edge that is to be aligned with the corresponding edge of the image object to distort the rectangular region into the trapezoid.

6. The method of claim 2, further comprising, responsive to a movement of the image object:
   moving the generated reflection proportionately to the movement of the image object; and
   applying a blur to each pixel of the moving generated reflection as a first function of a distance from a reference position.

7. The method of claim 6, wherein the applied blur increases as the distance from the reference position increases.

8. The method of claim 6, further comprising reducing an opacity of the generated reflection as a second function of the distance from the reference position.

9. The method of claim 8, wherein the first and the second functions are a same function.

10. The method of claim 8, wherein the first function and the second function are different ones of a linear function and a polynomial function.

11. The method of claim 2, wherein the image object is displayed to appear as if positioned above a glass pane and the generated reflection is displayed to appear as a reflection of the image object off the glass pane.

12. The method of claim 1, further comprising, when the method is used to generate a shadow of an image object:
   blackening the mirror image;
   reducing an opacity of the mirror image;
   flipping the mirror image;
   aligning an edge of the geometric region surrounding the flipped mirror image with a corresponding edge of the image object to generate the shadow; and
   displaying the image object with the generated shadow.

13. The method of claim 12, further comprising, responsive to a movement of the image object:
   moving the generated shadow proportionately to the movement of the image object; and
   applying a blur to each pixel of the moving generated shadow as a first function of a distance from a reference position.

14. The method of claim 13, wherein the applied blur increases as the distance from the reference position increases.

15. The method of claim 13, further comprising reducing an opacity of the generated reflection as a second function of the distance from the reference position.

16. The method of claim 2, further comprising, when the method is used to generate a shadow of an image object in addition to the reflection:
   copying the mirror image;
   blackening the mirror image copy;
   reducing an opacity of the mirror image copy;
   flipping the mirror image copy;
   aligning an edge of the geometric region surrounding the flipped mirror image copy with a corresponding edge of the image object to generate the shadow; and
   displaying the image object with both the generated reflection and the generated shadow.

17. The method of claim 16, wherein the image object is displayed to appear as if positioned above a glass pane, the generated reflection is displayed to appear as a reflection of the image object off the glass pane, and the generated shadow is displayed to appear as a shadow of the image object on the glass pane.

18. The method of claim 17, further comprising, for an object appearing as if positioned at least partially behind the glass pane:
- identifying pixels of the object positioned behind the glass pane;
- offsetting the identified pixels;
- blurring the identified pixels;
- increasing a color saturation of the identified pixels; and
- thereafter displaying the identified pixels.

19. The method of claim 18, wherein the object appearing positioned as if at least partially behind the glass pane is a wallpaper covered at least partially by an application program window with at least a portion of the wallpaper and at least a portion of the application program window appearing positioned behind the glass pane.

20. The method of claim 1, wherein the mirror image is a reversed copy of the image object.

21. The method of claim 1, wherein the mirror image is a user supplied image designated as the mirror image of the image object.

22. A non-transitory computer readable medium comprising a set of stored instructions that when executed by a processing device non-uniformly blur a mirror image of an image object and, cause the processing device to:
- identify a geometric region surrounding the mirror image of the image object;
- apply a keystone effect using a processing device to distort the geometric region;
- uniformly blur the distorted mirror image in the distorted geometric region;
- remove the distortion applied to the geometric region and the mirror image;
- align an outer boundary edge of the geometric region surrounding the mirror image with a corresponding edge of the image object to generate a reflection of the image object; and
- display the image object with the generated reflection, wherein the geometric region is a rectangular region, the rectangular region is distorted into a trapezoid in response to the keystone effect being applied, and the aligned edge of the rectangular region forms a longest base of a pair of parallel bases of the trapezoid.

23. The non-transitory computer readable medium of claim 22, further comprising additional instructions that when executed by the processing device, cause the processing device to:
- reduce an opacity of the mirror image.

24. The non-transitory computer readable medium of claim 23, further comprising additional instructions that when executed by the processing device, cause the processing device to:
- copy the mirror image;
- blacken the mirror image copy;
- reduce an opacity of the mirror image copy;
- flip the mirror image copy;
- align an edge of the geometric region surrounding the flipped mirror image copy with a corresponding edge of the image object to generate the shadow; and
- display the image object with both the generated reflection and the generated shadow.

25. A system comprising:
- a processing device for receiving an instruction to generate a reflection of an image object;
- an image processing unit including:
- an image identification module for identifying a geometric region surrounding a mirror image of the image object in the instruction received at the processing device;
- a distortion module for applying a keystone effect to distort the identified geometric region in the image identification module and removing the distortion applied to the geometric region and the mirror image;
- a blurring module for uniformly blurring the distorted mirror image before the distortion module removes the distortion;
- an alignment module for aligning an outer boundary edge of the geometric region identified by the image identification module surrounding the mirror image with a corresponding edge of the image object to generate the reflection; and
- a port for outputting the image object with the generated reflection to a display device after the applied distortion is removed by the distortion module, wherein the geometric region is a rectangular region, the rectangular region is distorted into a trapezoid in response to the keystone effect being applied, and the aligned edge of the rectangular region forms a longest base of a pair of parallel bases of the trapezoid.

26. The system of claim 25, wherein:
the image processing unit further includes a shadow module for copying the mirror image after the distortion module removes the distortion, blackening the mirror image copy, reducing an opacity of the mirror image copy, and flipping the mirror image copy;
the alignment module aligns an edge of a geometric region surrounding the mirror image copy flipped by the shadow module with a corresponding edge of the image object to generate a shadow; and
the port outputs the image object with the generated shadow and the generated reflection to the display device.

27. A system comprising:
- a processing device for receiving an instruction to generate a reflection of an image object;
- an image processing unit including:
- an image identification module for identifying a geometric region surrounding a mirror image of the image object in the instruction received at the processing device;
- a distortion module for applying a keystone effect to distort the identified geometric region in the image identified module and removing the distortion applied to the geometric region and the mirror image;
- a blurring module for uniformly blurring the distorted mirror image before the distortion module removes the distortion;
- a shadow module for blackening the mirror image, reducing an opacity of the mirror image, and flipping the mirror image after the distortion module removes the distortion;
- an alignment module for aligning an outer boundary edge of the geometric region identified by the image identification module surrounding the mirror image flipped by the shadow module with a corresponding edge of the image object to generate a shadow; and
- a port for outputting the image object with the generated shadow to a display device, wherein the geometric region is a rectangular region, the rectangular region is distorted into a trapezoid in response to the keystone effect being applied, and the aligned edge of the rectangular region forms a longest base of a pair of parallel bases of the trapezoid.

* * * * *